Dec. 1, 1942.  H. O. CLAYTON ET AL  2,303,937
TRANSMISSION CONTROL
Filed Dec. 27, 1938  2 Sheets-Sheet 2

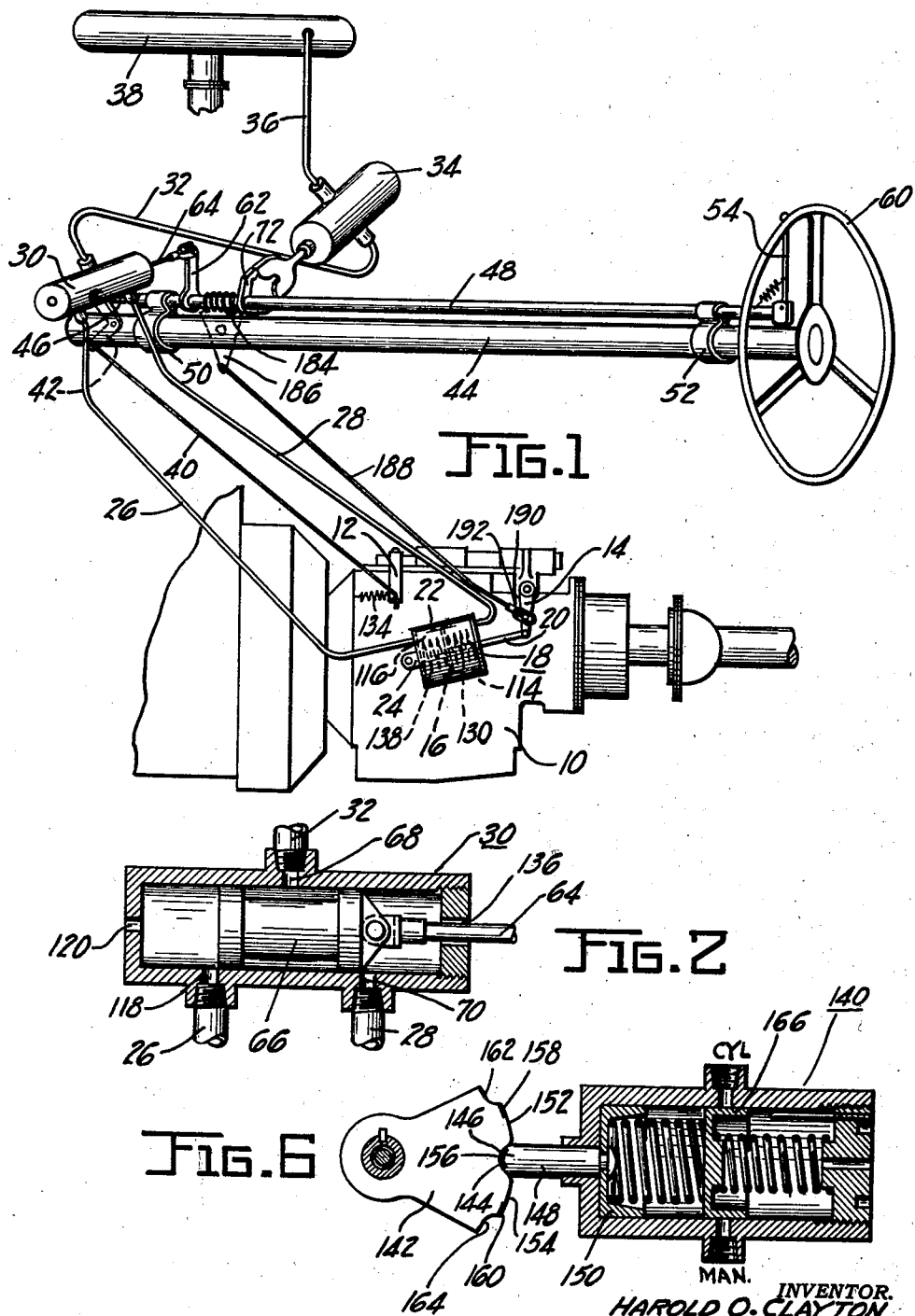

INVENTOR
HAROLD O. CLAYTON
WALTER L. KRIEG
BY H.O.Clayton
ATTORNEY

Patented Dec. 1, 1942

2,303,937

UNITED STATES PATENT OFFICE 2,303,937

TRANSMISSION CONTROL

Harold O. Clayton and Walter L. Krieg,
South Bend, Ind.

Application December 27, 1938, Serial No. 247,903

5 Claims. (Cl. 74—335)

This invention relates to motor vehicles and, more particularly, to controlling means for the change-speed transmission thereof.

Motor vehicles in general use have transmission gear sets which provide various torque or speed ratios between the motor and the rear wheels. The common way of selecting and engaging these gear sets is by means of a manually movable lever conveniently located near the hand of the driver.

There have been proposed various substitutes for the transmission and the transmission gear shifting lever, various positions for the shifting lever, and other modifications of the present generally used system, all designed for the purpose of simplifying the operations required of the driver. Some of these proposals are automatic or semi-automatic in their action, but most of them are more complicated to design, to manufacture and to service than is the construction now in general use, and they are, for these reasons, objectionable. On the other hand, there are definite objections to the construction now in general use and there is definite need for improvement, if such improvement may be accomplished without running into the complications which form so powerful an obstacle to the prior proposals. One of the objections to the present system is the relatively large force required to move the shifting lever when certain types of transmissions are being operated, or when the connections between the transmission and the lever are so constructed and arranged as to require such a force.

It is therefore one of the objects of the present invention to provide a transmission gear control mechanism so constituted as to avoid the above-referred-to difficulties.

Another object of the invention is to provide a power operated selective gear shifting mechanism so constructed and arranged that the operation of the control element of said mechanism in effecting an operation of the transmission gearing closely simulates the operation of a conventional manually operable gear shift lever to the end that the driver may readily control a vehicle equipped with such mechanism in the same manner as if the vehicle were provided with a manually operable gear shift.

Still another object contemplates the provision, in a device of the above character, of a remotely positioned relatively small gear shift lever or selector operable to effect the control of power to the power operated gear shifting mechanism, whereby an operator may readily and efficiently control the necessary changes in the gearing ratios of the transmission by manually moving the selector in the same, or substantially the same, manner as that to which he had been accustomed when manually shifting the transmission gearing by a shift lever extending from the floor of the driver's compartment.

A still further object is to provide a fluid pressure operated power gear shifting mechanism having a shift rail actuating motor, a manually operable control or selector member and valve means controlled by said member in such a manner that the movements of such control member, to effect a shifting of the transmission gears when the synchronizer mechanism of the transmission is functioning or when the gears about to be meshed are abutting each other and are rotating at different speeds, will be resisted by a force proportional to the force exerted by the power element of the aforementioned motor whereby a so-called "feel" or reaction to shifting will be experienced by the operator in a manner simulating the reaction encountered in manually shifting transmission gears in the conventional manner.

The invention further contemplates, the provision of a pressure differential operated or so-called pressure sensitive valve for controlling the gaseous pressure within one or the other of the compartments of a double-ended and double-acting transmission operating pressure differential operated motor, said valve, which is preferably mounted on or immediately adjacent the steering post of the vehicle, cooperating with a five-way selector valve, both of said valves being operated by a manually operated selector mounted adjacent the steering wheel of the vehicle.

One of the most important objects of our invention is to provide a motor for moving one or the other of the shift rails of the transmission, and a valve for in part controlling the motor and said valve may be so operated as to effect a variable rate of movement of the power element of the motor and to effect a varying load from said element to move the selected shift rail and place the gears in mesh. Preferably the operation is such that the shift rail is moved at a relatively high rate of speed until either the synchronizer of the transmission begins to function or the relatively rotating driving and driven gears abut each other prior to their being meshed. After said gears are brought to the same or substantially the same speed, valve mechanism of our invention may be so operated that the moving motor piston and the shift rail connected thereto slow down appreciably and come to a stop just as the meshing of the gears is completed. The abutment of the gears occurs when the low and reverse gear shift rail is moved, inasmuch as, in most transmissions of the day, there is no synchronizer mechanism to facilitate the operation of placing the transmission either in low or in reverse gear.

Yet another object of the invention is to include, in the force transmitting means for operating the aforementioned valve, a cam mechanism constituting a leverage-changing mechanism so constructed as to effect, first, a relatively rapid opening of the valve, the same to remain open for a limited time, then another opening movement of the valve and, finally, a closing movement thereof.

Other objects of the invention and desirable details of construction and combinations of parts will become apparent from the following detailed description of certain embodiments of the invention, taken in conjunction with the accompanying drawings illustrating said embodiments, in which:

Figure 1 is a diagrammatic view disclosing the principal elements of the transmission operating means constituting our invention;

Figure 2 discloses, in section, the five-way selector valve for in part controlling the operation of the transmission operating mechanism;

Figure 3:
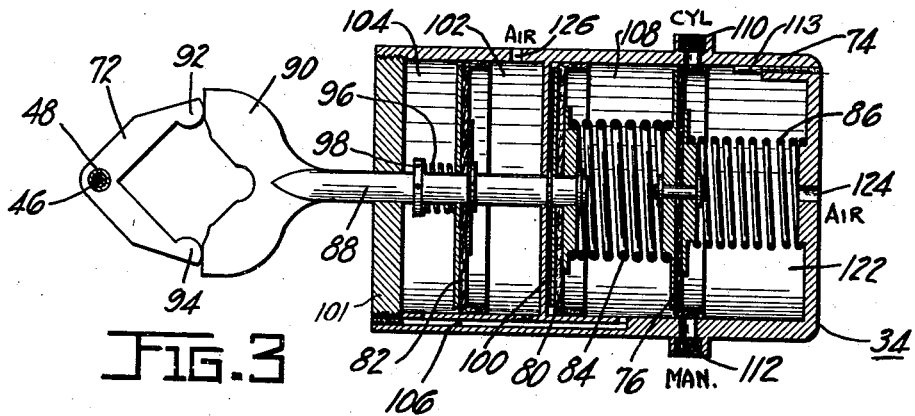
Figure 3 is a view disclosing the motor controlling follow-up valve, together with the principal elements of the operating means therefor.
Figure 4:
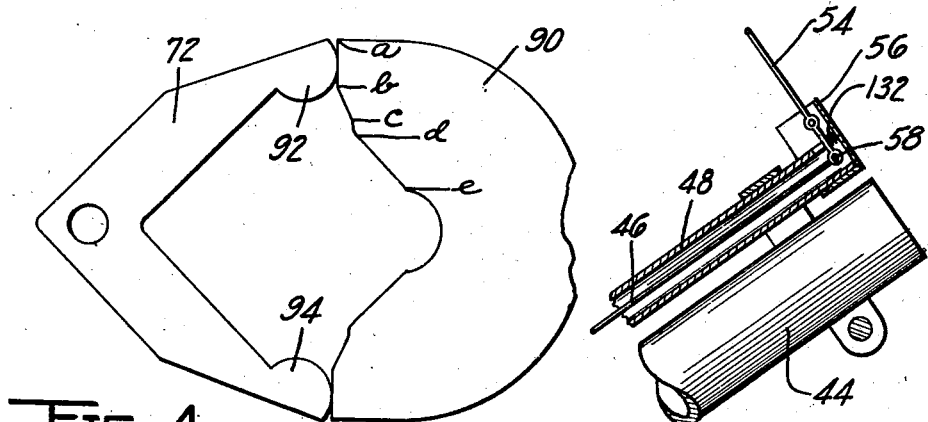
Figure 4 is an enlarged view disclosing, in detail, the cam structure for operating the control valve.
Figure 5:
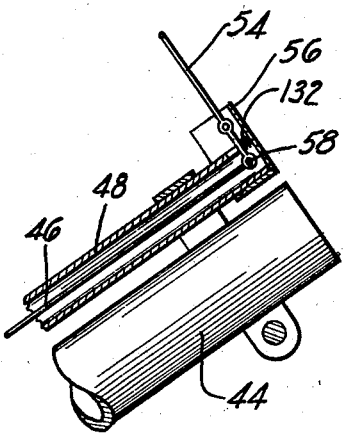
Figure 7:
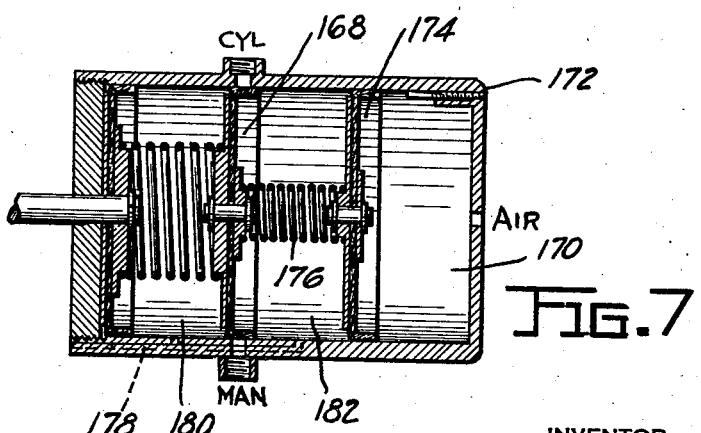

Figure 5 discloses the details of the selector mounted beneath the steering wheel;

Figure 6 is a view, similar to Figure 3, disclosing another embodiment of the valve operating mechanism operative to control the transmission operating motor; and Figure 7 is a modified form of control valve unit including a pressure differential operated valve operating member.

In that embodiment of our invention disclosed in Figure 1 of the drawings, there is disclosed, in side elevation, a three-speeds forward and reverse transmission 10, which may be the transmission used in the 1939 models of the Chevrolet automobile. A crank 12 serves, when operated, to select the transmission shift rail to be operated, that is, either the low and reverse shift rail or the second and high shift rail: and a crank 14 serves, when rotated, to move the selected rail to establish the transmission in the desired gear ratio. The aforementioned Chevrolet transmission is provided with two such cranks.

Describing now the mechanism of our invention for operating the cranks 12 and 14, the reciprocable piston 16 or power element of a double-ended double-acting pressure differential operated shift rail actuating motor 18 is connected by a rod 20 to the crank 14. The cylinder 22 or power element of the motor is preferably pivotally secured, by a bracket 24, to the housing of the transmission 10. To the ends of the cylinder there are connected conduits 26 and 28, which are connected to a five-way selector valve 30, disclosed in detail in Figure 2. A conduit 32 interconnects the valve 30 with a pressure differential and manually operated control valve 34, shown in detail in Figures 3, 6 and 7, and a conduit 36, interconnecting the valve 34 with the intake manifold 38 of the internal-combustion engine, completes the fluid transmitting connections between the source of vacuum and the pressure differential operated motor 18 to be energized. The crank 12, which when operated effects a selection of the shift rail to be operated, is rotated by force transmitting means including a link 40, which is connected to a bell crank lever 42 pivotally mounted on the steering column 44. To the lever 42 there is connected a link 46, which is telescoped within a tube 48 secured by brackets 50 and 52 to the steering column.

Describing now the operation of the transmission operating mechanism and, incidentally, describing in greater detail the construction of the mechanism, after the clutch has been disengaged and the accelerator released to make of the intake manifold a source of vacuum, a selector or lever 54 is operated to place the transmission in gear. As disclosed in Figure 5, the manually operated selector or control member is pivotally mounted within a casing 56, the latter being mounted on the end of the tube 48. Describing the cycle of operations necessary to place the transmission in low gear, the selector is first rotated upwardly or counterclockwise in a plane perpendicular to the plane of the steering wheel, thereby moving the link 46, pivotally connected to the selector at 58, downwardly through the tube 48. The bell crank lever 42 is thus moved counterclockwise to place the link 40 in compression and rotate the crank 12 counterclockwise. This movement of the crank 12 effects a selection of the low and reverse shift rail of the transmission.

Having selected the low and reverse shift rail to be operated, the selector 54 is then rotated clockwise in a plane parallel or substantially parallel to the plane of the steering wheel 60. This operation serves to rotate the tube 48 about its longitudinal axis and to rotate, in a clockwise direction, a crank 62 connected by a link 64 to a spool valve member 66 of the aforementioned selector valve 30. As will be apparent from an inspection of Figure 2, the valve member 66, when moved to the right, serves to place valve ports 68 and 70 in fluid transmitting connection with each other. This rotation of the tube 48 also serves to rotate a two-armed crank member 72 clockwise to open the control valve 34. This valve comprises a casing 74, which houses a cup-shaped pressure sensitive valve member 76, cup-shaped valve operating members 80 and 82, a spring 84 interposed between the members 76 and 80, and a spring 86, weaker than spring 84. To the valve operating member 80 there is secured a connecting rod 88, U-shaped at its end 90 to provide a cam member contacted by cam members 92 and 94 on the crank 72. The valve operating member 82 is loosely sleeved over the rod 88 and contacts a spring 96, also loosely sleeved over the rod. This spring contacts a stop 98 secured to the rod 88. A partition 100, together with the valve operating member 82 and an end wall 101 and a portion of the body of the casing 74, outline chambers 102 and 104. This part of the mechanism together with that portion of the rod 88 within the chambers 104 and 102 together constitute what may be defined as a motor, the member 82 constituting the power element thereof. This motor aids in the operation of the valve member 76 inasmuch as the same constitutes means, in addition to the pressure sensitive valve member 76 and the parts associated therewith, for obtaining feel, that is resisting the movement of the selector 54. A duct 106 in the casing 74 serves to place the chambers 104 and 108 in fluid transmitting connection with each other. The casing is provided with ports 110 and 112 connected with the conduits 36 and 32 respectively, which lead to the intake manifold 38 and to the selector valve 30 respectively.

Continuing the description of the operation of placing the transmission in its low gear setting, the first increment of movement of the selector 54 clockwise serves to open the valve by moving the valve member 76 and the valve operating members 80 and 82 to the right, Figure 3, at a relatively rapid rate. This action is effected by virtue of the camming action of the member 92 upon the uppermost section of a flat portion a—b of the cammed end portion 90 of the rod 88. The valve member 76 is thus quickly moved to open the valve by uncovering the ports 110 and 112, thus placing a chamber 114 of the motor 18 in fluid transmitting communication with the manifold; for it will be remembered that the five-way selector valve 30 has been so opened as to make this connection possible. The rate of efflux of air from the chamber 114, determining the gaseous pressure within the said chamber and perforce the differential of pressures acting upon the piston 16, is controlled by the area of the ports 110 and 112, which are uncovered when the valve operating members 80 and 82 and the valve member 76 connected thereto move to the right, as above described. The parts of the force transmitting linkage including the cam member 92 are preferably so constructed and arranged that the ports 110 and 112 are completely uncovered, when the valve is opened, thereby effecting a relatively high rate of efflux of air from the chamber 114. However, the maximum opening of the valve may be determined by an adjustable stop 113. This flow of air results in the crank 14 being subjected to a force of sufficient magnitude to overcome the resistance met by the detent mechanism cooperating with the rails of the transmission and to move the low and reverse shift rail relatively fast, until the gears for establishing the low gear setting of the transmission contact with each other, or until said gears are in mesh. If the gears abut before meshing, as is usually the case, they will very quickly thereafter be brought to the same speed, whereupon they will be meshed. The motor piston 16, upon encountering the resistance resulting from this contacting of the gears, stops moving until said gears are moving at the same speed, and this interruption of movement of the piston results in a decrease in the gaseous pressure within the chamber 114. This decrease in gaseous pressure, that is increase of vacuum, results from the flow of air from the chamber, which is, of course, continued after the motor piston is stopped. A motor chamber 116 is at the time vented to the atmosphere via ports 118 and 120 of the selector valve 30, resulting in the piston 16 being subjected to the above-described force to move the low and reverse shift rail of the transmission.

As the gaseous pressure within the chamber 116 decreases, the gaseous pressure within chambers 104 and 108 in the valve 34 also decreases, for the three chambers are in fluid transmitting connection with each other, and accordingly the gaseous pressures are the same in these chambers. Drop in pressure within the valve chambers 104 and 108 results in the valve member 76 and the valve operating members 80 and 82 being subjected to a change in differential pressure acting thereon. The valve member 76 is subjected to a force tending to move the same to the left to close the valve; for air is admitted to a chamber 122 in the valve 34 via a port 124, and the chamber 108 is at the time partially evacuated as just described. The valve operating member 82 is at the time subjected to a force tending to move the same to the left, for its left face is exposed to the partially evacuated chamber 104 and its right face is exposed to atmospheric pressure, the chamber 102 being vented to the atmosphere via a port 126. The valve operating member 80 is at the time subjected to a slight differential of pressures, tending to move the same to the right, for its right face is exposed to the rarefied air within the chamber 108 and its left face is exposed to the air within an air-tight chamber outlined, in part, by the partition 100 of the valve casing 74 and by the outer face of the member 80. However, the parts of the valve and valve operating mechanism are so constructed that the force tending to move the member 80 to the right is far less than the force tending to move the members 76 and 82 to the left.

As a result of this operation, that is the opening of the valve, the driver of the vehicle feels an increased resistance to movement of the selector 54 when the two abutting gears are rotating at different speeds, and the piston 16 is held stationary; for as above described the valve operating member 82 and the valve member 86 are subjected to a loading tending to move the same to the left to rotate the crank 62 counterclockwise and counteract the movement of the selector to open the valve. Upon encountering this resistance, which in this art is known as "feel" the driver may stop the movement of the selector and if this is done the floating spring 96 will be compressed to shorten the same and the floating spring 84, which is in series in the connection between the valve member 76 and the valve operating member 80, will also be compressed to shorten the same, thereby permitting the valve member 76 to move to the left, Figure 3, toward a valve closed position. Preferably the parts are so constructed and arranged that during this period, that is when the abutting gears are rotating at different speeds, the gaseous pressure within the chamber 114 is sufficiently low to effect the greatest force upon the crank 14, that is a force from the piston 16 greater than the force therefrom at any other time during the movement to place the transmission in low gear.

It should be noted at this juncture that the cam member 90 and its cooperating parts are so shaped as to maintain the aforementioned valve open position of the connecting rod 88 until the gears of the transmission abut preliminary to their being brought to the same speed and then slipped into mesh one with another. This position of the rod 88 is maintained as the cam 92 passes over a section b—c on the member 90. As the gears are spinning in frictional contact with each other to reduce the speed of the faster moving gear the member 92 may be moved into contact with an area c—d, curved to effect a slight valve opening movement of the rod 88. Thereafter, and while the spinning gears are being brought to the same speed, the valve may be moved to its closed position. The area c—d effects a valve opening movement of the rod 88 to the right; however, the effect of this movement, that is the opening movement of the valve, is offset by the above described compression of the spring 84. The parts are so constructed and arranged that the gaseous pressure to which the piston 16 is subjected is so controlled when the gears are being brought to the same speed, as to effect an appreciable load upon said gears and effect the desired synchronization thereof. When the piston 16 stops it follows that this gaseous pressure will decrease during this period; however, the above described closing movement of the valve prevents too great a reduction of the pressure and, accordingly, too great a load upon the gears.

Now, after the driving and driven gears are brought to the same speed, very little force from the piston 16 is needed to thereafter effect a meshing of the same. Accordingly, during the last increment of movement of the selector to its low gear position, the cam member 92 contacts a curved area d—e, so shaped as to cooperate with the spring 84 and effect a closing movement of the valve. The resulting progressive decrease in the uncovered area of the ports 110 and 112 effects a deceleration of the motor piston 16 and the crank 14 connected thereto; for which the closing of the valve the rate of efflux of air from the chamber 116 progressively decreases. The valve operating mechanism is so constructed and arranged that when the gears are completely meshed the valve is completely closed. The piston 16 is accordingly brought to a complete stop, thus preventing its ramming the end wall of the cylinder 22, which is a very desirable feature of our invention.

As briefly described supra, should the movement of the selector 54 be completely stopped before it reaches its low gear position, the valve will close, for the evacuation of the valve chamber 116 will continue, until the valve member 76 is moved to completely close the ports 110 and 112. The connection with the manifold having been cut off, the motor piston 16 will stop moving, and the system will then be in equilibrium. The driver may then complete the meshing of the gears by resuming the movement of the selector, which will again open the valve to resume the movement of the piston.

After the transmission has been placed in low gear, the clutch is reengaged and the accelerator depressed to place the vehicle in motion.

To place the transmission in second gear, the selector is moved counterclockwise back to its transmission neutral position. This operation, of course, returns the valves 30 and 34 to the positions disclosed in Figures 2 and 3, the motor piston 16 being returned to its neutral position by a spring 130. The selector 54 is then permitted to move downwardly, or clockwise, under the action of a spring 132, which is aided by a spring 134 biasing the crank 12 to its second and high gear shift rail selecting position. The selector is then moved counterclockwise in a plane parallel to the steering wheel to place the transmission in second gear.

The operation of the mechanism to establish the transmission in second gear will be obvious from an inspection of the figures of the drawing and from the detailed description of the invention given above. Accordingly, the description of this operation will not be given in detail. Suffice it to say that the piston 66 of the selector valve 30 is moved to the left, Figure 2, to vent the motor chamber 114 to the atmosphere, via conduit 28, port 79 and a port 136, and to place the chamber 116 in fluid transmitting connection with the control valve 34. The operation of the latter is identical, whether the crank 72 be moved clockwise or counterclockwise, for the lower halves of the crank 72 and the member 90 are identical in construction with the upper halves thereof.

To place the transmission in high gear, after second gear has been established, the selector is again rotated clockwise to effect, first, a neutralization of the transmission by a spring 138 within the motor 18 and then an energization of said motor in the same manner necessary to place the transmission in low gear. In placing the transmission either in second gear or in high gear, the means for synchronizing the gears to be meshed functions momentarily to stop the movement of the motor piston 16 until the driving and driven gears are brought to the same speed. In other words, the synchronizing means effects the same operation of the transmission operating mechanism as does the operation of the driving and driven gears, as described above.

There is disclosed in Figure 6 another embodiment of our invention, wherein a different form of cam mechanism is used to operate the valve 140. As disclosed, the entire end portion of a crank 142 constitutes a cam member, the face of which is recessed at 144 to effect the relatively rapid movement of the member 150 to open the valve. The rounded end 146 of a pin 148 serves as the cooperating cam member, said pin being secured to the valve operating member 150.

Describing the operation of the valve operating mechanism disclosed in Figure 6, and incidentally completing the description of the camming members 144 and 146, after the valve has been opened, continued angular movement of the member 142 serves to bring the rounded end 146 into contact with either area 152 or 154, depending of course upon the direction of rotation of the selector. As with the valve operating mechanisms of Figure 3, the valve is maintained wide open during this period in the cycle of operations, and, as with the previously described mechanism, the valve ports 110 and 112 are to some degree closed as the synchronizer is functioning. During this period, when the synchronizer is functioning, a pad 156 of friction material, e. g., brake lining, contacts one or the other of similar pads 158 or 160, the latter being so curved as to effect a reopening of the valve in the event the same is closed. The pads will also serve, when the aforementioned back pressure is developed, to increase the resistance to movement of the selector to thus aid in obtaining the desired "feel." The resistance to the movement of the selector, resulting from the pressure differentials acting upon members 166 and 150, is thus supplemented by the resistance encountered when the pad 156 strikes either of the pads 158 or 160. After the synchronizer has functioned, further movement of the selector brings one or the other of recesses 162 and 164 in the crank 142 into registry with the end 146 of the pin 148 to thus permit the valve to completely close. In brief, the mechanism of Figure 6 accomplishes the same function as the mechanism disclosed in Figure 3.

There is disclosed in Figure 7 another embodiment of pressure differential operated means for operating a control valve member 168. In this mechanism, a compartment 170 in a control valve 172 houses a reciprocable piston or valve operating member 174. This member is yieldably connected, by a spring 176, with the valve member 168, and the valve casing is bored to provide a conduit 178, placing a compartment 180 in fluid transmitting connection with a compartment 182. The operation of this mechanism is similar to the mechanism disclosed in Figure 3, the movable valve operating member 174 being subjected to a force, tending to close the valve member 168, which is directly proportional to the force exerted by the motor piston as it actuates the crank 14 to place the gears in mesh.

There is thus provided a power means for operating a three-speeds forward and reverse transmission, the pressure differential operated motor of the power means being controlled by two valves, one of which is operated manually by the selector to open the valve and by power means to close the same. The operation of the selector closely simulates the operation of the shift lever of the conventional present-day transmission. The cam members 90 and 92, the arms of the crank 72, the spring 84, the ports 110 and 112, etc., and the parts of the valve mechanism are so constructed and arranged that the various degrees of force necessary to move the selector during its cycle of movement closely simulate the various degrees of force necessary to operate the aforementioned shift lever. When the synchronizer of the transmission begins to function, the driver of the vehicle senses this operation, for at this time the gaseous pressure within the valve chamber 106 appreciably decreases, thereby requiring an added effort to movement of the selector.

Linkage, including a worm 184, segment 186, link 188 and overrunning joint 190 at the end of link 188, may also be provided to insure an operation of the crank 14 in the event of failure of the motor 18. To this end, the end of the crank 14 is so positioned within a slot 192 in the overrunning joint 190 as to bring the link 188 into contact with the crank when, but not until when, the operation of the synchronizer is initiated.

One of the principal features of our invention lies in the resistance to movement of the selector, or so-called "feel," this resistance being at all times directly proportional to the force required to move the shift rails, for at all times during the cycle of operations the gaseous pressures within the chamber 108 and one or the other of the motor chambers 114 and 116 are equal or substantially so.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. In an automotive vehicle provided with a three-speeds forward and reverse transmission including a plurality of shift rails, power means for operating said rails including a double-ended double-acting pressure differential operated motor operably connected to means for operating said rails, valve mechanism for controlling the operation of said motor including a selector valve operable to determine the direction of movement of the power element of the double-acting motor, said valve mechanism further including a pressure sensitive type of control valve, a manually operated selector for controlling the operation of said valves, and means operable by the selector for operating both valves, said latter means including means for varying the degree of opening movement of the control valve to thereby so energize the shift rail operating motor as to vary the speed of movement of its power element as the transmission is being established in gear.

2. In an automotive vehicle provided with an intake manifold and a selective transmission mechanism having a shiftable transmission operating member movable in opposite directions from a neutral position into different transmission setting positions, means for operating the transmission including power means for moving said member, said power means including a double-acting double-ended pressure differential operated motor, valve means for controlling the operation of said motor including a pressure differential operated reciprocable valve member, fluid transmitting means interconnecting said intake manifold, valve means and motor, a manually operated valve operating selector, and force transmitting means interconnecting said selector and reciprocable valve member including a pressure differential operated member, means interconnecting said member with the valve member, and means interconnecting said pressure differential operated valve operating member and selector including a leverage-changing mechanism operable, upon movement of the selector, to vary the degree of movement of said force transmitting means and accordingly to vary the degree of opening movement of said valve member.

3. In an automotive vehicle provided with a transmission having a shiftable transmission operating member movable in opposite directions from a neutral position into different transmission setting positions, power means for moving said member, said power means including a double-acting pressure differential operated motor comprising a casing and a power element, means interconnecting the power element with the shiftable transmission operating member to be moved, valve mechanism for controlling the operation of said motor including a selector valve operable to so control the energization of the motor as to determine the direction of movement of said power element, a manually operated and pressure differential operated valve operable to so control the gaseous pressure within one or the other of the compartments of the motor as to determine both the rate and degree of movement of the power element of the motor and the shift rail connected thereto, a manually operated selector and force transmitting means interconnecting the selector, both valves and the shiftable transmission operating member, said force transmitting means including a leverage-changing mechanism operable to so open the manually and pressure differential operated valve as to effect the above-referred-to changes in gaseous pressure within the motor, and further including means to move said valve in but one direction irrespective of whether the selector is moved clockwise or counterclockwise.

4. In an automotive vehicle provided with an intake manifold and a transmission having a shiftable transmission operating member movable in opposite directions from a neutral position into different transmission setting positions, power means for moving said member including a double-acting pressure differential operated motor the power element of which is connected to said member, valve means for controlling the operation of said motor including a selector valve operable to control the direction of flow of air into and from said motor to thereby determine the direction of movement of the power element of said motor when the same is moving to actuate the transmission operating member, and also including a manually and pressure differential operated valve means operative to control the rate of flow of air from said motor, a conduit interconnecting the manifold with the pressure differential and manually operated valve means, a plurality of conduits interconnecting the selector valve and motor, and a conduit interconnecting the selector valve and manually and pressure differential operated valve, a manually operated selector and force transmitting means interconnecting the selector with both of the aforementioned valves, said latter force transmitting means including a crank member and a cam member contactible by the crank member, said members being so constructed and arranged as to make possible different degrees of opening of the manually and pressure differential operated valve as the selector is moved from its transmission neutral position to any one of its gear establishing positions, the valve being first opened and then finally closed during its cycle of operation.

5. In an automotive vehicle provided with a source of vacuum and a transmission having shiftable transmission operating member movable in opposite directions from a neutral position into different transmission setting positions, means for moving said member to establish the transmission in a desired gear ratio, said means including a double-acting double-ended pressure differential operated motor, valve means for controlling the operation of said motor including a casing, a plurality of ports in said casing, a reciprocable pressure sensitive valve member within the casing operable to cover or uncover said ports, another casing and a reciprocable valve member within said latter casing, the latter casing and valve member constituting a selector valve serving to control the admission of air into one end of the motor while the efflux of air from the remaining end of the motor is being controlled by the pressure sensitive valve member, fluid transmitting means interconnecting said casings, source of vacuum and motor, a manually operated selector member, and valve operating means operable in part by the selector and including a pressure differential operated motor operative to affect the movement of the selector as it is moved to open the pressure sensitive valve member, said valve operating means being operative when the movement of the selector is momentarily stopped to permit the reciprocable pressure sensitive valve member to move to close the valve covering said ports and thereby momentarily maintain the then existing energization of the motor.

HAROLD O. CLAYTON.
WALTER L. KRIEG.